United States Patent [19]

Canevari et al.

[11] 4,030,070

[45] June 14, 1977

[54] POSTAGE METER SETTING DEVICE

[75] Inventors: Louis T. Canevari, Norwalk; Vincent G. Coppola, North Branford; Daniel F. Dlugos, Huntington; Gerald C. Freeman, Darien; Flavio M. Manduley, Seymour, all of Conn.

[73] Assignee: Pitney-Bowes, Inc., Stamford, Conn.

[22] Filed: May 17, 1976

[21] Appl. No.: 687,043

[52] U.S. Cl. ...................... 340/147 R; 235/92 EA; 340/325

[51] Int. Cl.² .......................................... H04Q 1/00

[58] Field of Search ........... 340/147 R; 235/92 EA, 235/92 CA, 61.9 C; 101/93 C

[56] References Cited

UNITED STATES PATENTS 3,770,945 11/1973 Dlugos ......................... 235/92 EA

*Primary Examiner*—Harold I. Pitts

*Attorney, Agent, or Firm*—Peter Vrahotes; William D. Soltow, Jr.; Albert W. Scribner

[57] ABSTRACT

A postage meter setting device is described which includes electromechanical apparatus for positioning the various digit selector arms of a postage meter in accordance with the corresponding required postage. Stepper motors drive various digit selector arms through a mechanical linkage, which provides a one to one rotational relationship between the meter selector arms and the linkage. Use of stepper motors results in reduced wear and cost of operation.

12 Claims, 8 Drawing Figures

FIG. 3
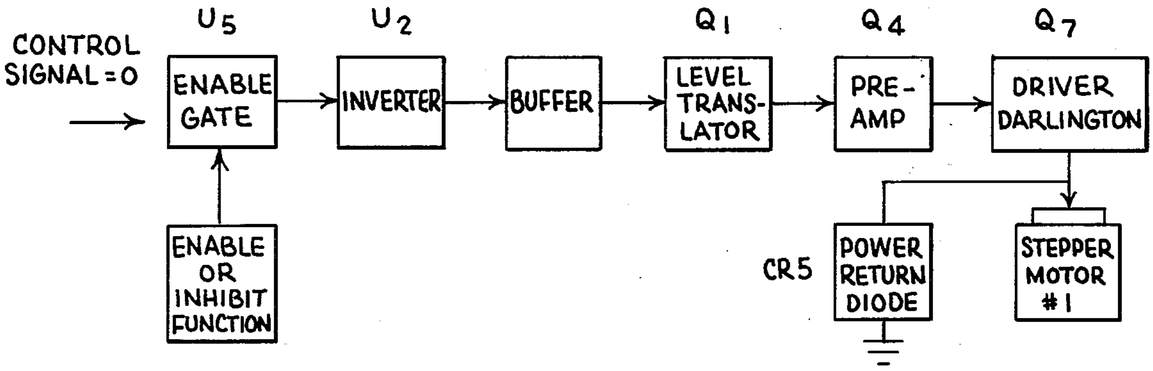
FIG. 4
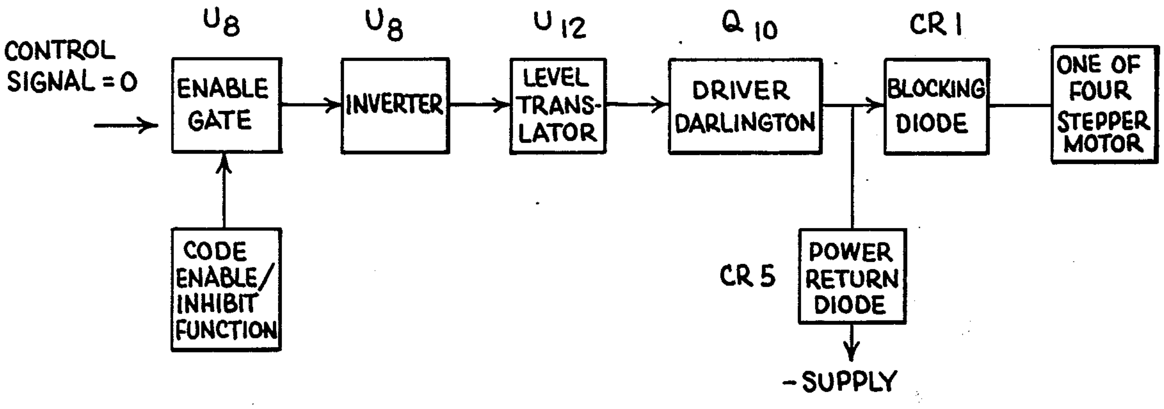
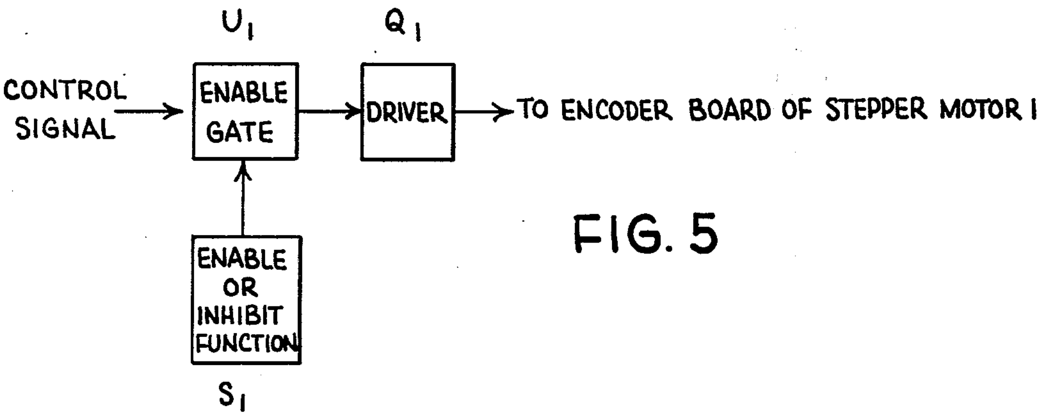
FIG. 5

POSTAGE METER SETTING DEVICE

BACKGROUND OF THE INVENTION

There have been a number of proposals for postage systems to be used in the mailing or shipping of parcels. A comprehensive or universal system must be sufficiently flexible to handle a number of variables which are involved, for example, the weight of each parcel must be determined with reasonable accuracy and speed and the distances between the original site and the various destinations must be determined in order to identify the appropriate postal zone for each parcel. After this is accomplished the postage applicable to each parcel must be determined on the basis of its weight and destination or postal zone. Having determined the applicable postage, a postage meter, or the like, is then operated to issue a stamp imprinted with that postage; the stamp being adhered to or imprinted upon the parcel.

A system which fully satisfies the above requirements is described in U.S. Pat. No. 3,770,945 issued to Dlugos et al, Nov. 6, 1973. There is disclosed in said patent an apparatus for interfacing an electronic postage metering system with a conventional mechanical postage meter. Separate position encoders translate the digit positions of the various postage digit selector arms of the postage meter into coded digits which are compared with the corresponding postage digits stored in the system postage output register. The postage digit selector arms are selectively driven through their various digit positions, and as each assumes the digit positions corresponding to the associated digits in the postage register, they are decoupled from their respective drives. When all have been positioned to set up a digit by digit comparison with the postage held in the postage register, the postage meter is triggered to issue a postage imprinted stamp.

Although the above mentioned system meets the requirements set forth, there are certain areas where improvements can be made. For example, the system described in U.S. Pat. No. 3,770,945 involves the use of electronic clutches which are engageable with a drive shaft which is constantly driven. This obviously involves a waste of energy as the drive shaft is energized whether or not the meter is in use. Additionally, the postage meter reseting means is unidirectional, thereby resulting in wasted motion.

SUMMARY OF THE INVENTION

The meter resetting device disclosed herein involves the use of stepper motors which may be rotated in either direction in response to a control input. The established meter setting is determined and the next required resetting is input into the system. The logic then determines the direction of rotation for each stepper motor for the shortest distance of lever movement, and the stepper motors are enabled the necessary length of time to obtain the desired resetting. Appropriate linkage is provided between the stepper motor and postage meter lever to provide for the bidirectional movement of the levers.

DESCRIPTION OF THE DRAWING

FIG. 3 shows a block diagram of the logic involved in the selection of a stepper motor used in the instant invention.

FIG. 4 shows a block diagram of the encoder logic involved in selecting one of four windings of the stepper motor.

FIG. 5 shows a block diagram used to select one of four encoders.

DETAILED DESCRIPTION

Figure 2:
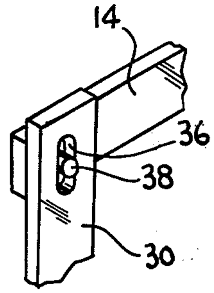
FIG. 2 shows a cross-sectional, enlarged view of the connection of the linkage and the digit selector arms shown in FIG. 1.
Figure 1:
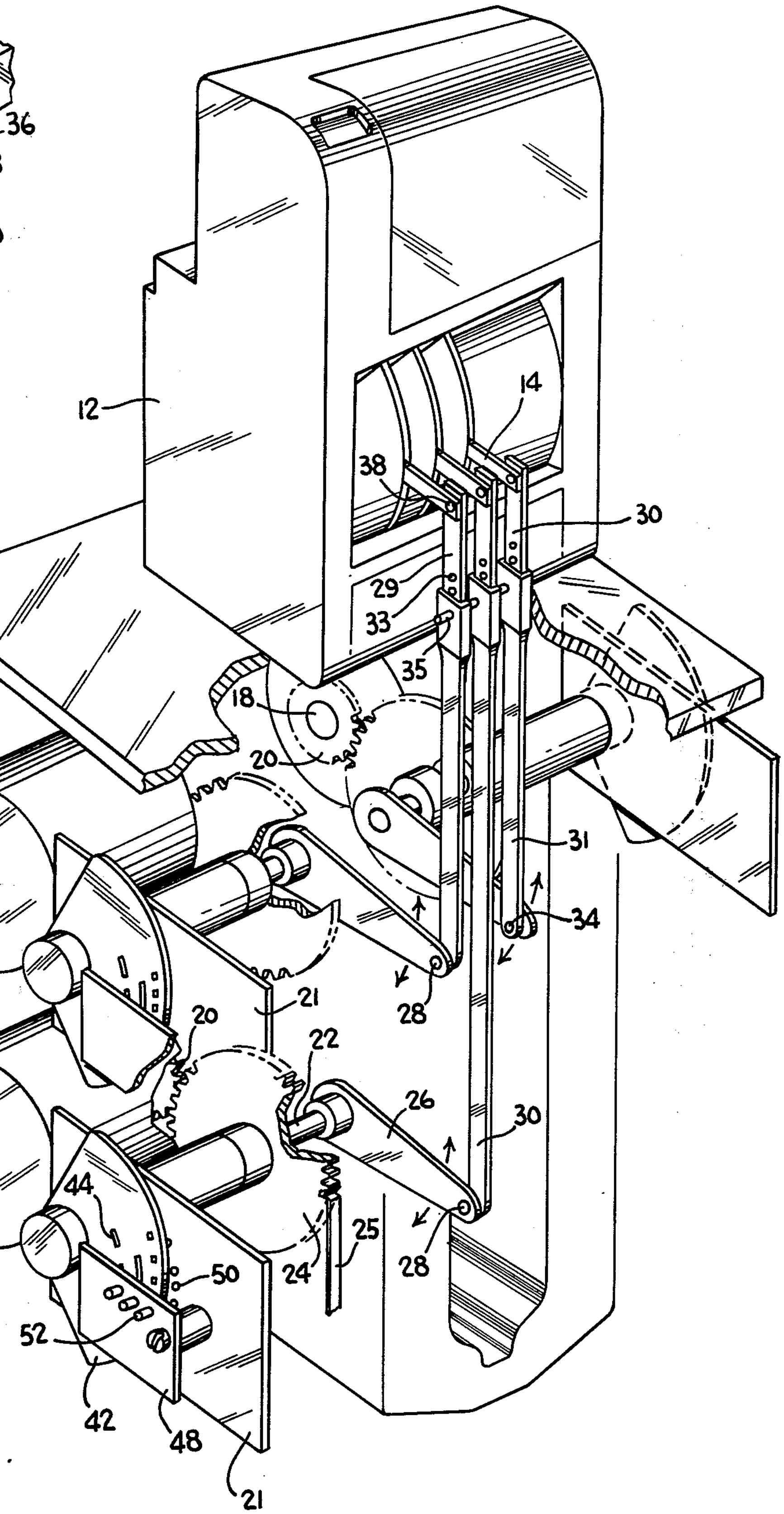
FIG. 1 shows a perspective view of postage meter setting apparatus which incorporates the features of this invention.

Referring now to FIGS. 1 and 2, the postage meter resetting device of this invention includes a housing 10 upon which a postage meter 12 is supported. Although the invention may apply to any type of meter, the invention is described specifically as it may be applied to a Pitney Bowes Postage Meter Model Number 5300. The postage meter 12 has digit selector arms 14 extending therefrom, three being shown. One of these arms 14 would be used for selecting of the cent column, the second one the tens column, and the third the dollar column.

Disposed within the housing 10 are a plurality of stepper motors 16, three being shown, whose number is equal to the number of digit selector arms 14 of the postage meter 12. Each stepper motor 16 has a drive shaft 18 extending therefrom to which a drive gear 20 is secured for rotation therewith. Rotatably supported by a plate 21 within the housing 10 are a plurality of crank shafts 22 which are spaced from and parallel to the drive shafts 18 on a paired basis. Each crank shaft 22 supports a driven gear 24 which is in meshing engagement with the drive gear 20 thereby providing drive to the crank shaft 22. Three detent springs 25 (only one being shown) are supported within the housing 10, each engaging a driven gear 24 to hold the gear in a detented position when the power to its associated stepper motor 16 is terminated.

At one end of the crank shaft 22 is a crank arm 26 which is fixedly secured thereto for rotation therewith. The crank arm 26 has a pin 28 at one end thereof which pin 28 is also pivotably received within one end of a linkage member 30, which linkage member may be made of two parts. The linkage member 30 has an opening 34 at one of its ends in which the pin 28 of the crank arm 26 is received. The other end of the linkage member 30 has a longitudinally extending slot 36 which receives a pin 38 that is secured to a selector arm 14. This arrangement provides a degree of slippage, the amount of slippage being determined by the length of the slot 36. This slippage is provided so that the movement of the selector arms 14 by the linkage members 30 will not interfere with the internal detent mechanism of the postage meter 12 which accurately locates the positions of the selector arms. The slippage allows the internal postage meter 12 detent to act on its own after being placed in proximity of the home position by the setting mechanism. This prevents the linkage member 30 from holding the selector arm 14 out of detent which could prevent the meter 13 from operating properly. As indicated previously, the linkage member 30 may be in two parts, an upper part 29 and a lower part 31. The lower end of the upper part 29 has a plurality of openings and is adapted to receive the top of the lower part 31 which has a spring loaded pin 35. This allows the length of the linkage to be changed as required.

At the ends of each crank shaft 22 opposed to the crank arm 26 is an encoder disc 42 having a plurality of openings 44 therein. The encoder disc 42 is sandwiched between the support plate 21 and a second plate 48, which second plate is also supported by the housing 10 by appropriate support means (not shown). A light source 50 is secured to one of the plates 21 and a detector 52, such as a photocell is secured to the opposite plate 48. This combination of openings 44, light 50 and detector 52 provide means for determining the angular displacement of the crank shaft 22 thereby indicating to the appropriate logic system the location of the linkage 30 and the corresponding selector arms 14.

One of the advantages of the previously described resetting device is that the radial movement of the crank arm 26 may have a one to one relationship with the movement of the selector arms 14. Having such one to one ratio means that the distance from the crank shaft 22 to the postage meter 12 may vary without requiring adjustment of the gear ratios. For example, a 2.16 gear reduction between the stepper motors 16 and the crank shaft 22 with a three inch radius on the crank arm 26 enables a one to one movement relationship between the crank arms 26 and the selector arms 14.

Referring now to FIGS. 3, 4, 5 and 6*a–c*, an electronic control system is provided for controlling the mechanical linkage system shown in FIGS. 1 and 2. The electronic control system of this invention may be connected to appropriate units such as a scale, display panel, keyboard, encoder disc 42 and control circuitry for supplying a control signal thereto. Since these units do not form a part of this invention, they will be represented only as an input signal and referred to collectively as the "input circuitry". Reference may be made to the aforementioned U.S. Pat. No. 3,770,945 for a description of a suitable "input circuitry".

Figure 6A:
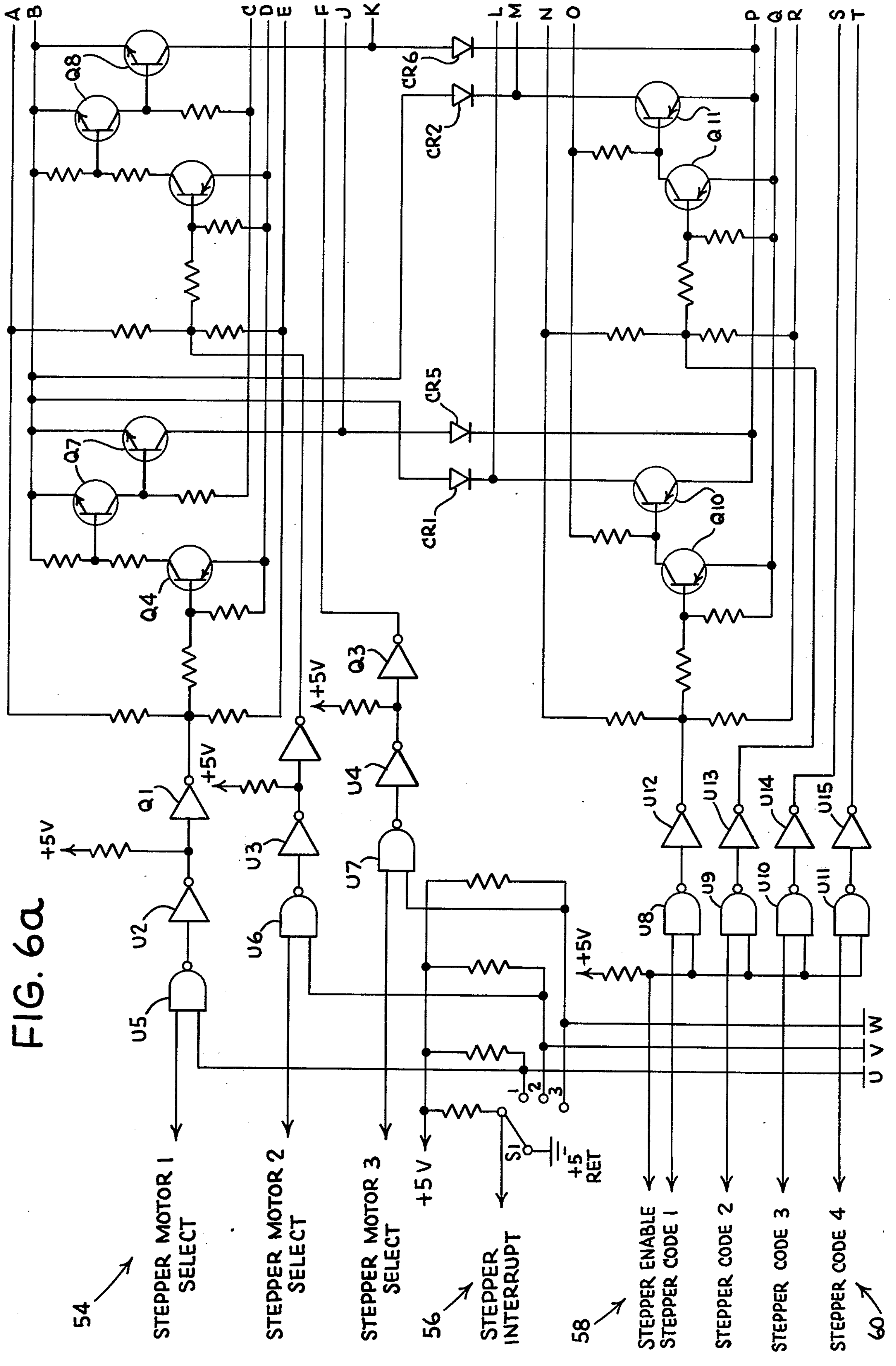
FIGS. 6*a*–6*c* show a schematic diagram of the electronic circuitry used to control the drive of the meter setting device of FIG. 1, 6*b* being a longitudinal extension of 6*a*, and 6*c* being a vertically downward extension of 6*a*.

As described above, control of the postage meter selector arms 14 is accomplished by the gear arrangement associated with the drive shaft 18 of each stepper motor 16, which in turn is controlled by the stepper driver control system shown in FIGS. 6*a–*6*c*. Each stepper motor 16 has four windings M1—1 through M3–4. Bidirectional selector arm 14 movement is accomplished by manipulating the stepper motors 16 in a clockwise (CW) or counter-clockwise (CCW) direction. This is done by applying a forward or reverse code to the stepper motors 16. The setting of one selector arm 14 one digit involves energizing a coded combination of two of the four stepper motor windings nine times (steps) each, as for example, four milleseconds for a total of 36 milleseconds. The code to generate a CW movement may be as follows:

| Step | Winding No. 1 | No. 2 | No. 3 | No. 4 |
|---|---|---|---|---|
| 1 | 0 | 1 | 0 | 1 |
| 2 | 0 | 1 | 1 | 0 |
| 3 | 1 | 0 | 1 | 0 |
| 4 | 1 | 0 | 0 | 1 |
| 5 | 0 | 1 | 0 | 1 |
| 6 | 0 | 1 | 1 | 0 |
| 7 | 1 | 0 | 1 | 0 |
| 8 | 1 | 0 | 0 | 1 |

-continued

| Step | Winding No. 1 | No. 2 | No. 3 | No. 4 |
|---|---|---|---|---|
| 9 | 0 | 1 | 0 | 1 |

The code to generate a CCW movement may be as follows:

| Step | Winding No. 1 | No. 2 | No. 3 | No. 4 |
|---|---|---|---|---|
| 1 | 0 | 1 | 0 | 1 |
| 2 | 1 | 0 | 0 | 1 |
| 3 | 1 | 0 | 1 | 0 |
| 4 | 0 | 1 | 1 | 0 |
| 5 | 0 | 1 | 0 | 1 |
| 6 | 1 | 0 | 0 | 1 |
| 7 | 1 | 0 | 1 | 0 |
| 8 | 0 | 1 | 1 | 0 |
| 9 | 0 | 1 | 0 | 1 |

Figure 6B:
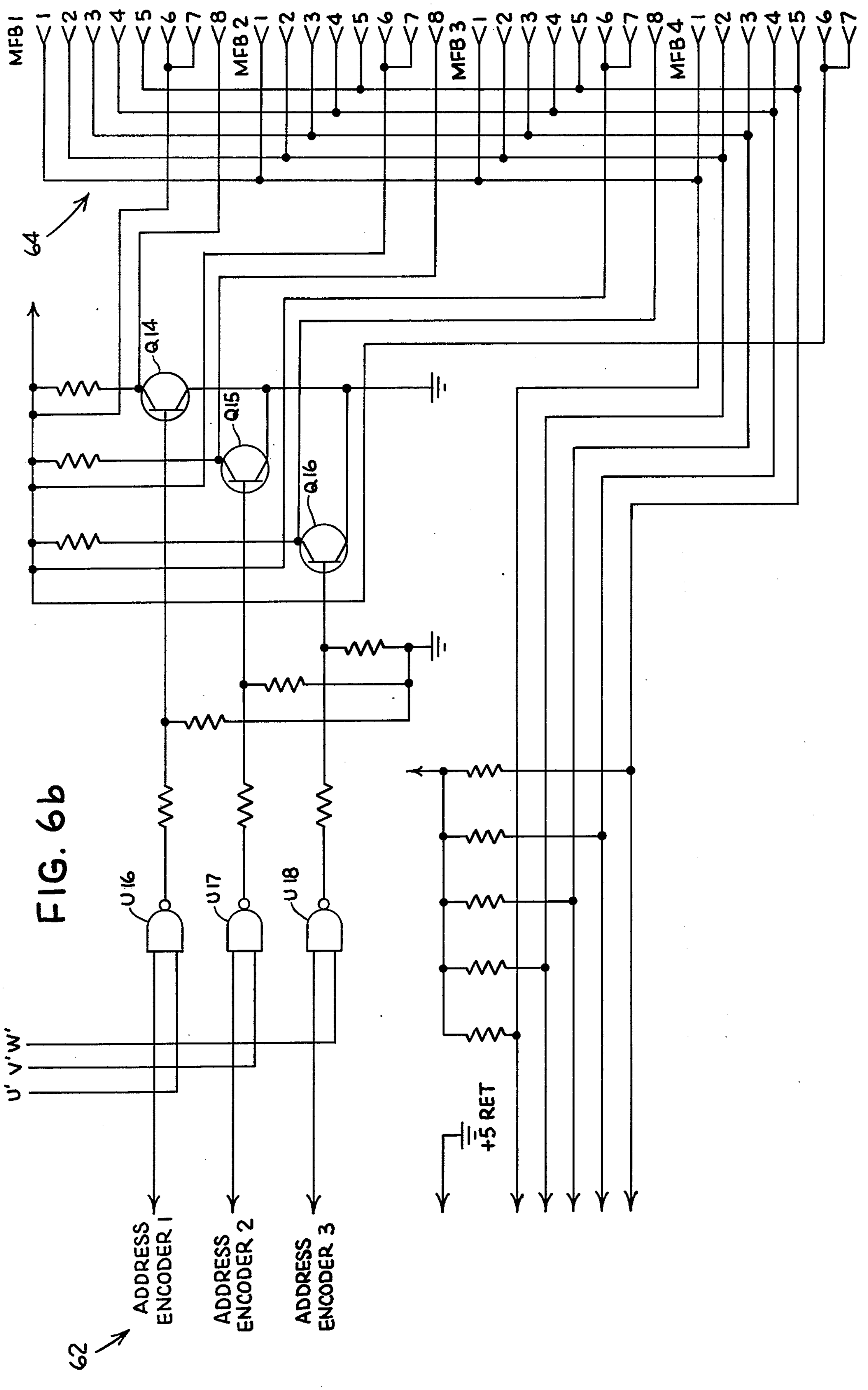
Figure 6C:
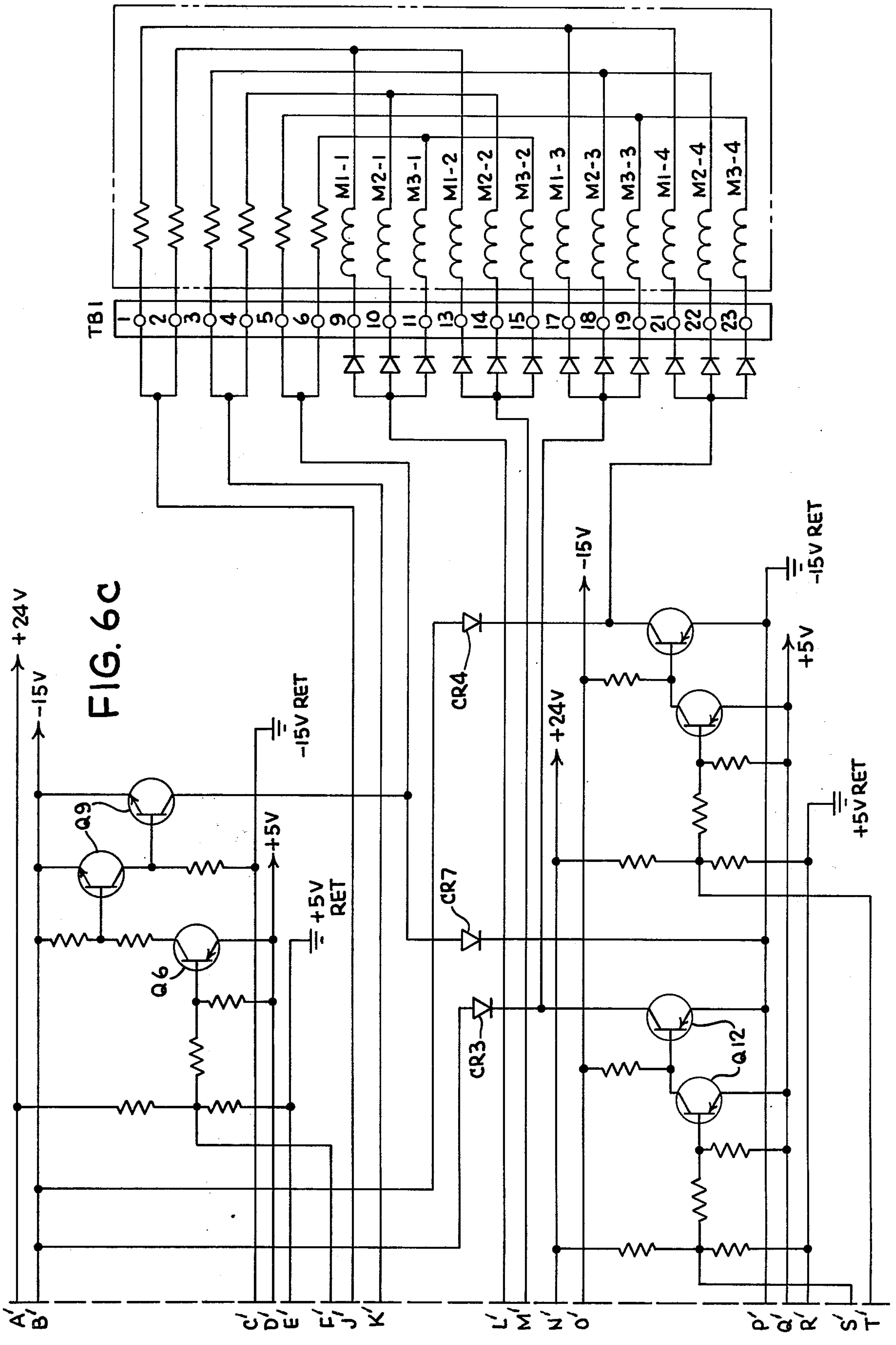

As can be seen in FIG. 6*a–6c*, various voltages are provided to the control system displayed therein, +5 volts being provided for logic drive, +24 volts for the level translation functions, and −15 volts for the drive of the stepper motors 16.

Selection of one of the three stepper motors 16 to be energized is accomplished by a stepper motor select logic circuit 54. Each select circuit 54 includes an enable gate $U_5 - U_7$ connected to the input circuitry, an inverter $U_2 - U_4$, a level translator $Q_1 - Q_3$, a preamplifier transistor $Q_4 - Q_6$, a Darlington driver $Q_7 - Q_9$ all generally connected to one another in series and with associated buffers, resistors and codes. A block diagram showing the logic involved in the selection of $M_1$ is shown in FIG. 3. A selection signal is applied to $M_1$ first, $M_2$ second, etc. The stepper motor drive resulting from the stepper motor select logic 54 is in the the form of a low voltage-high current source for each stepper motor 16.

A set up switch 56 is provided to generate an interrupt signal when the set-up switch is in position 1, 2 or 3. This inhibits the stepper motor select 54 signal from being generated. Normal operation occurs when the set up switch 56 is in the $S_1$ position. When in position 1–3, the interrupt signal allows alignment, check-out or set-up for the respective stepper motors 16.

A stepper enable circuit 58 inhibits or enables a stepper motor code logic 60 which applies the appropriate code to the stepper motors 16. The stepper motor code logic 60 includes enable gates $U_8 - U_{11}$, which are electrically connected to the input circuitry of inverters $U_{12} - U_{15}$, Darlington drivers $Q_{10} - Q_{13}$, blocking diodes $D_1 - D_4$ and power return diodes $D_5 - D_7$ generally connected to one another in series. A block diagram showing the logic involved in applying the appropriate code to one of the four windings M of a stepper motor 16 is shown in FIG. 4.

Upon selection of the appropriate winding M, a two bit code is applied to each stepper motor 16 to enable it to move clockwise, counterclockwise, or stop as described previously. Drive from the stepper motor code logic 60 is in the form of a high voltage — high current source. Selection of one of the four encoders is accomplished by an address encoder circuit 62. This logic follows the same general routine as the stepper motor select 54. Encoder select drive results from the address encoder circuit 62 in the form of medium current sources.

Components for selecting one of four encoders consists of enable gates $U_{16}$ – $U_{18}$ which are electrically connected to the input circuitry drivers $Q_{14}$ –$Q_{16}$ and their associated resistors as represented in the block diagram shown in FIG. 5.

Motor feedbacks are accomplished through time shared outputs of the address encoders 62. Four motor feedback encoders MFB1 – MFB4 are included on a stepper driver board 64. Motor feedback encoders MFB1 through MFB4 are presented to the stepper driver board for termination. The wired or outputs of motor feedback supplies information to the input circuitry.

In order to reduce electronic components and increase reliability, the stepper motors 14 are energized in a serial manner ($M_1$ – $M_2$, $M_2$ – $M_3$). Each motor is energized for as long as it is necessary to reach its destination, for example, 0.036 sec. per step or 0.324 sec. for all 9 digits. When all stepper motors 16 have reached their prescribed destinations, all power is removed thereby lending to longevity of the motors and associated electronics.

The conventional technique for driving a stepper motor is to overdrive it by a ratio between 12:1 thru 17:1. By employing the logic of the invention in conjunction with the stepper motors 16, this overdrive may be reduced to a ratio to between 6:1 thru 9:1, thereby reducing power consumption by 50%.

The control of the individual stepper motors 14, which in turn is in control of the meter setting levers, is accomplished in the following sequence. Stepper motor $M_1$ is selected at the same time a 2 bit code is applied to the input of the Stepper Motor Code logic 60. When $M_1$ has reached its destination, control is taken away from $M_1$ and applied to $M_2$ by the Stepper Motor Select logic 54 and the appropriate code is applied by the stepper motor code logic 60. When $M_2$ has reached its destination, control is taken away from $M_2$ and applied to $M_3$ by Stepper Motor Select logic 54 and the appropriate code is applied to the Stepper Motor Code logic 60. When $M_3$ has reached its destination, all control is removed from the Stepper Motor Select logic 54.

What is claimed is:

1. Apparatus for remotely resetting the postage selector levers of a postage meter, comprising:
   - A. a housing;
   - B. a plurality of stepper motors each having a drive shaft extending therefrom;
   - C. a drive gear secured to each of said motor shafts;
   - D. a plurality of crank shafts rotatably secured within said housing;
   - E. a driven gear secured to each of said crank shafts, each of said driven gears being meshed within a drive gear;
   - F. a plurality of crank arms each secured at one end of said crank shafts for rotation therewith;
   - G. means associated with each crank shaft for determining the rotational position of each crank arm;
   - H. a plurality of linkage members each having one end pivotably secured to one of said crank arms and its opposite end connected to a postage selector lever; and
   - I. means for selectively energizing said stepper motors to selectively reset the postage selector lever.

2. The apparatus of claim 1 wherein each of said postage selector levers and said connector links have a free play connection.

3. The apparatus of claim 1 wherein the movement of each of said crank arms has a one to one relationship with the movement of its associated selector lever.

4. The apparatus of claim 1 wherein the length of said linkage members is adjustable.

5. The apparatus of claim 1 wherein said means for energizing said stepper motors comprises logic means for selecting which of said motors is to be energized, electronic means for selectively enabling said stepper motor, and feedback means for terminating said energizing means.

6. The apparatus of claim 5 wherein:
   - A. said means for selecting said stepper motors, is a stepper motor select circuit defining an electrical path having an enable gate connected to receive an input signal, an invertor, a level translator, a preamplifier, a diode and a Darlington driver electrically connected on one another;
   - B. said means for selectively enabling said stepper motor includes:
     1. a stepper enable circuit connected to receive an input signal, and
     2. a stepper code circuit having an enable gate electrically connected to said stepper enable circuit, an inverter, a level translator, a Darlington driver, a blocking diode and a power return diode electrically connected to one another; and
   - C. said motor feedback means includes an address encoder circuit comprising an enable gate connected to receive an input signal and connected to said stepper motor enable gate and a driver electrically connected to said address encoder gate and to said stepper motor.

7. Apparatus for remotely resetting the postage selector levers of a postage meter, comprising:
   - A. a housing;
   - B. a plurality of stepper motors each having a drive shaft extending therefrom;
   - C. a drive gear secured to each of said motor shafts;
   - D. a plurality of crank shafts rotatably secured within said housing;
   - E. a driven gear secured to each of said crank shafts, each of said driven gears being meshed within a drive gear;
   - F. a crank arm secured to each of said crank shafts for rotation therewith;
   - G. means associated with each crank shaft for determining the rotational location of each crank arm;
   - H. a connector link pivotably secured to said crank arms and connected to a postage lever with a free play connection; and
   - I. means for selectively enabling said stepper motors to rotate said drive shaft in a clockwise or counterclockwise direction.

8. The apparatus of claim 7 wherein each of said postage selector levers and said connector links have a free play connection.

9. The apparatus of claim 7 wherein the movement of each of said crank arms has a one to one relationship with the movement of its associated selector lever.

10. The apparatus of claim 7 wherein the length of said linkage members is adjustable.

11. The apparatus of claim 7 wherein said means for energizing said stepper motors comprises logic means for selecting which of said motors is to be energized, electronic means for selectively enabling said stepper motor, and feedback means for terminating said energizing means.

12. The apparatus of claim 11 wherein

A. said means for selecting said stepper motors, is an address encoder circuit defining an electrical path having an enable gate, means for enabling or inhibiting said enable gate, an invertor, a level translator, a preamplifier, a diode and a Darlington driver operatively connected on one another;

B. said means for selectively enabling said stepper motor includes:
   1. a stepper enable circuit connected to receive an input signal, and
   2. a stepper code circuit operatively electrically connected to said address encoder circuit and having an enable gate, means for enabling and inhibiting said enable gate electrically connected to said stepper enable circuit, an inverter, a lever translator, a Darlington driver, a blocking diode and a power return diode electrically connected to one another; and C. said motor feedback means includes an address encoder circuit comprising an enable gate, electrically connected to receive an input signal and electrically connected to said stepper motor enable gate and a driver electrically connected to said address encoder gate and to said stepper motor.

* * * * *